(12) United States Patent
Kimura

(10) Patent No.: US 8,936,161 B2  
(45) Date of Patent: Jan. 20, 2015

(54) CONTROL VALVE FILTER DEVICE

(75) Inventor: Takashi Kimura, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 257 days.

(21) Appl. No.: 13/333,808

(22) Filed: Dec. 21, 2011

(65) Prior Publication Data

US 2012/0160762 A1    Jun. 28, 2012

(30) Foreign Application Priority Data

Dec. 24, 2010 (JP) ................. 2010-287741

(51) Int. Cl.
     *B01D 35/02*      (2006.01)
     *B01D 35/28*      (2006.01)
     *B01D 29/11*      (2006.01)

(52) U.S. Cl.
     CPC ...... *B01D 29/112* (2013.01); *B01D 2201/4084* (2013.01)
     USPC ...... 210/495; 210/232; 210/497.01; 210/499; 210/430; 210/432

(58) Field of Classification Search
     None
     See application file for complete search history.

(56) References Cited

U.S. PATENT DOCUMENTS

| | | | |
|---|---|---|---|
| 7,041,217 B1 * | 5/2006 | Close et al. | 210/232 |
| 7,963,487 B2 * | 6/2011 | Saltenberger et al. | 248/74.1 |
| 2009/0084727 A1 * | 4/2009 | Yonezawa | 210/495 |
| 2012/0174548 A1 * | 7/2012 | Konzelmann | 210/232 |

FOREIGN PATENT DOCUMENTS

| | | | |
|---|---|---|---|
| JP | 2002-285966 A | | 10/2002 |
| JP | 2007-000791 | * | 1/2007 |

* cited by examiner

*Primary Examiner* — Benjamin Kurtz  
(74) *Attorney, Agent, or Firm* — McGinn IP Law Group, PLLC

(57) ABSTRACT

One embodiment provides a control valve filter device, including: a belt-like frame body curved into a ring shape so that its ends face each other, the frame body having an opening; a filter member provided in the opening of the frame body; an engagement claw extended from one of each of both corresponding lateral portions of the faced ends of the frame body; and a concave portion provided at the other of each of the both corresponding lateral portions of the faced ends of the frame body, so as to be engaged by the engagement claw, each concave portion being formed laterally of the opening of the frame body.

20 Claims, 5 Drawing Sheets

CONTROL VALVE FILTER DEVICE

CROSS-REFERENCE TO RELATED APPLICATION(S)

This application claims priorities from Japanese Patent Application No. 2010-287741 filed on Dec. 24, 2010, the entire contents of which are incorporated herein by reference.

FIELD

The present invention relates to a control valve filter device that is attached to a control valve for controlling a fluid pressure or the like, and prevents intrusion of foreign matter into the control valve.

BACKGROUND

In an engine, an automatic transmission or the like of an automobile, for example, a control valve for controlling the pressure of fluid such as fuel or oil or for changing the passage of fuel or oil has been used in many cases. If foreign matter contained in fluid has intruded into such control valve, its normal operation might be inhibited. Thus, a filter is attached to such control valve for catching foreign matter contained in fluid.

JP-2002-285966-A discloses a filter in which a frame body (53, the number in the brackets corresponds to the reference numeral in JP-2002-285966-A) is dividable at its ends. At the ends of the frame body (53), an engagement portion (55) for engaging the both ends and a retaining portion (56) for retaining the engaged state are provided.

The frame body (53) includes a pair of parallel ring frames (53a) and plural ribs (53b) connecting the ring frames (53a). Window parts (53c) defined by the ring frames (53a) and the ribs (53b) are provided with a mesh member (54). As the engagement portion (55), a hook part (55a) is provided at one end of the frame body (53), and the rod (55b) to be engaged therewith is provided at the other end of the frame body (53). And, as the retaining portion (56), a claw part (56) is provided at the other end in the vicinity of the rod (55b). A width of the hook part (55a) corresponds to a distance between the pair of ring frames (53a). After the hook part (55a) at the one end is hooked on the rod (55b) at the other end, the resulting engaged state is retained by the claw part (56), thereby attaching the filter to a control valve without disconnection.

In JP-2002-285966-A, when the hook part (55a) is engaged with the rod (55b), the tip of the hook part (55a) overlaps with the window part (53c) of the frame body (53), and the window part (53c) is narrowed. Therefore, an effective area of the mesh member (54) provided in the window parts (53c) is reduced. Further, since the hook part (55a) has a large width corresponding to the distance between the ring frames (53a), the window part (53c) is further narrowed when the hook part (55a) is engaged with the rod (55b).

SUMMARY

One object of the present invention is to provide a control valve filter device capable of ensuring large openings of a frame body so as to obtain a large effective area of a filter when the control valve filter device is attached to a control valve.

One embodiment provides a control valve filter device, including: a belt-like frame body curved into a ring shape so that its ends face each other, the frame body having an opening; a filter member provided in the opening of the frame body; an engagement claw extended from one of each of both corresponding lateral portions of the faced ends of the frame body; and a concave portion provided at the other of each of the both corresponding lateral portions of the faced ends of the frame body, so as to be engaged by the engagement claw, each concave portion being formed laterally of the opening of the frame body.

At each end, the engagement claw may be provided at one of the lateral portions, and the concave portion may be provided at the other of the lateral portions.

At each end, a laterally-extended extension may be provided at a base side of the engagement claw. At each end, a thin portion recessed so as to receive the associated engagement claw and the associated extension may be provided at a tip side of the concave portion. Lateral surfaces of the extensions of the both ends may abut against each other.

According to the above configurations, the frame body is expanded and placed in a peripheral groove formed at an outer peripheral surface of a control valve, and the engagement claws are engaged with the concave portions of the frame body, thus allowing the filter device to be attached to the control valve. In this case, the concave portions with which the engagement claws are to be engaged are formed laterally of the openings of the frame body, and the engagement claws are engaged with the concave portions in these regions, thus making it possible to ensure the large openings of the frame body without narrowing the openings and to increase an effective area of the filter member.

The large openings of the frame body can be ensured; hence, even when the filter device attached to the peripheral groove of the control valve is rotated and the openings of the frame body are circumferentially deviated, a port part of the control valve can be prevented from being completely closed. Even when the control valve has a small diameter, a large effective area of the filter member is realized.

DETAILED DESCRIPTION

One embodiment of the control valve filter device will be described with reference to FIG. 1 to FIGS. 5A and 5B.

Figure 1:
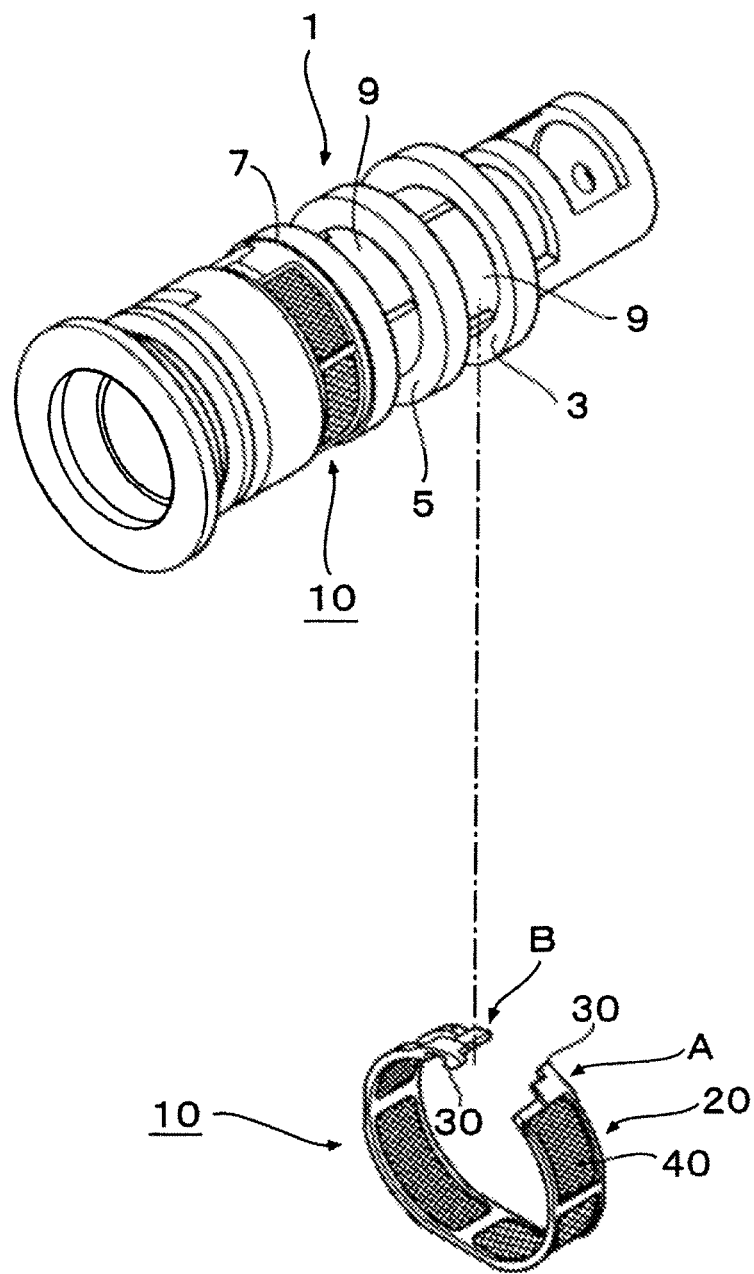
FIG. 1 illustrates an attachment of a control valve filter device according to one embodiment to a control valve.

For example, a control valve 1 is provided in an oil hydraulic circuit of an automobile engine to change oil passage or perform pressure adjustment, or is provided in a fuel supply system to perform fuel injection amount adjustment, injection timing adjustment, etc. As illustrated in FIG. 1, a control valve filter device (filter device) 10 according to the embodiment is attached to the control valve 1. Plural peripheral grooves 3, 5 and 7 are formed on an outer periphery of the control valve 1 at given intervals along its axial direction. In this embodiment, the filter device 10 is attached to each of the peripheral grooves 3 and 7 located on both sides of the peripheral groove 5 in the axial direction. The peripheral grooves 3, 5 and 7 are each provided with a port part 9 communicated with the inside of the control valve 1.

Figure 2A:
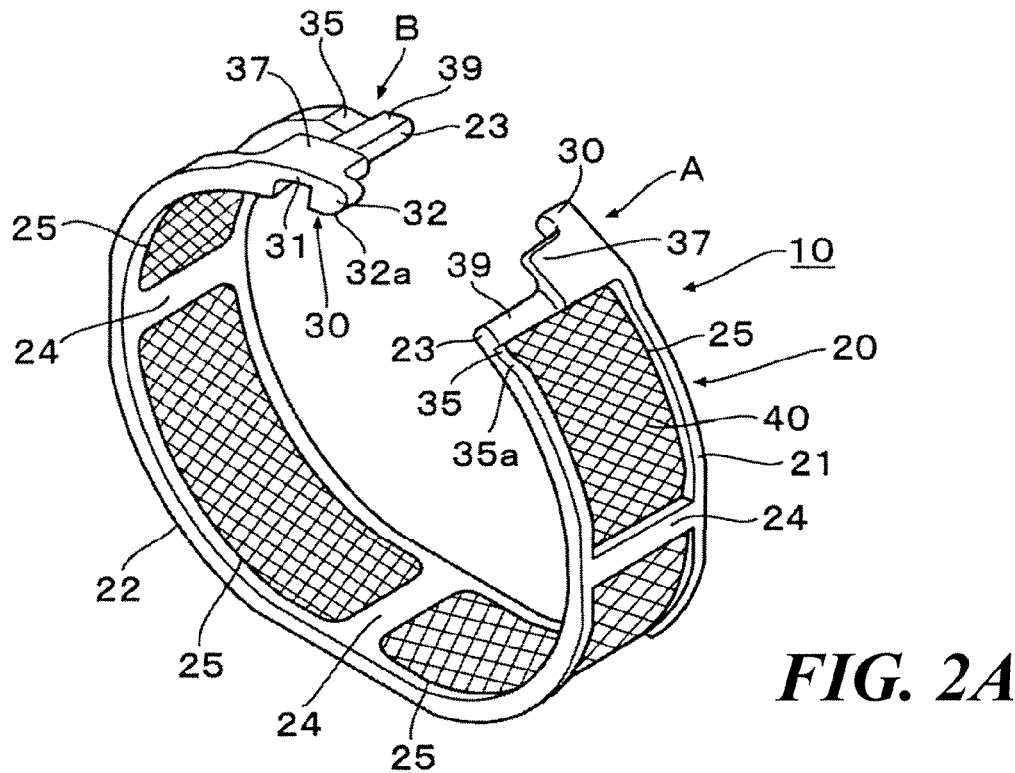
FIG. 2A illustrates the control valve filter device.

As illustrated in FIG. 1 and FIGS. 2A and 3B, the filter device 10 according to this embodiment is elongated into a belt-like shape, and is curved into a C-shaped ring so that its longitudinal ends A and B face each other. The filter device 10 has, at its belt-like region, a frame body 20 provided with plural openings 25, and a filter member 40 provided in the openings 25 of the frame body 20 in a stretched state.

The frame body 20 may be made of, for example, a synthetic resin such as a polyamide resin, a fluorocarbon resin, polybutylene terephthalate or polyphenylene sulfide, or a synthetic resin reinforced by mixing glass fiber or the like into one of the above mentioned resins. For example, the filter member 40 may be provided as a mesh member formed by a wire of metal such as stainless steel, or a wire of resin such as polyethylene.

Figure 2B:
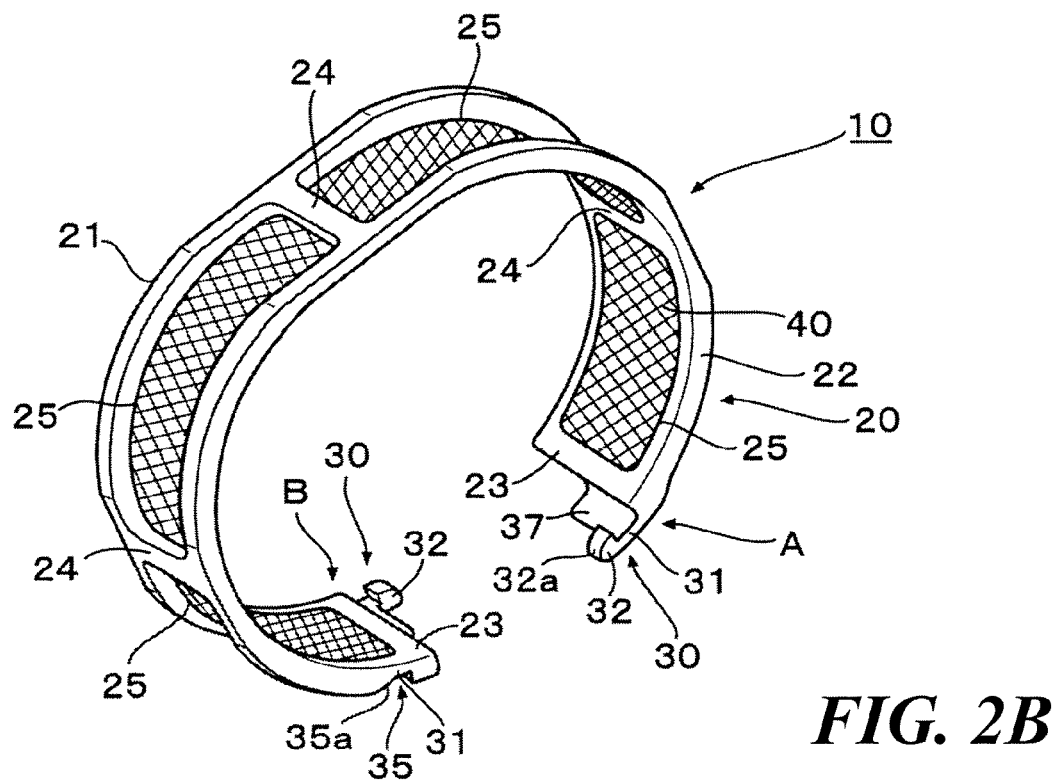
FIG. 2B illustrates the control valve filter device from the different angle.
Figure 3:
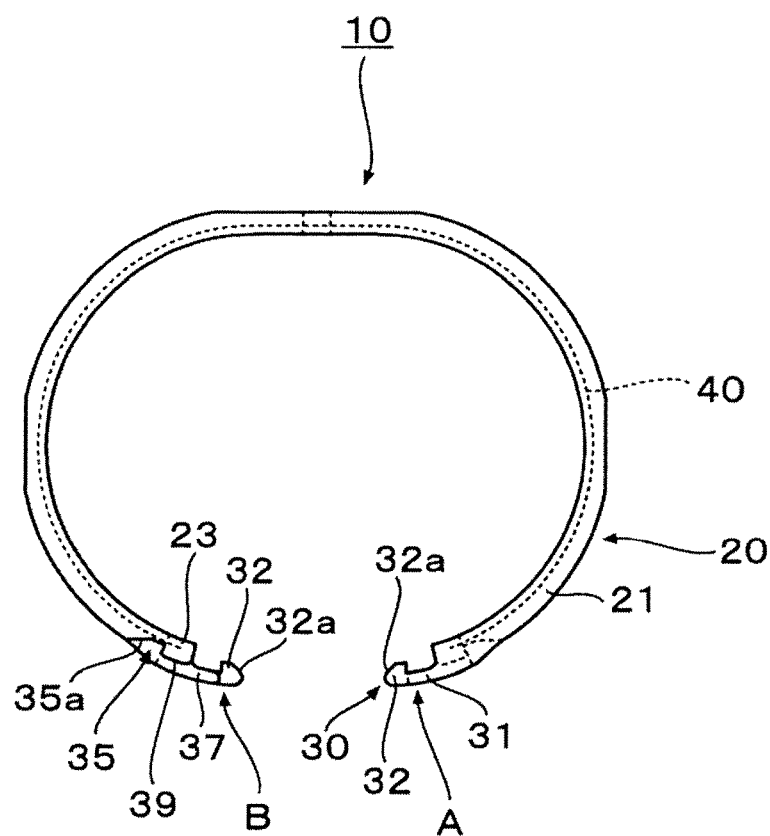
FIG. 3 is a plan view of the control valve filter device.

For example, the filter member 40 is placed inside a mold in advance and then the above-mentioned synthetic resin is injected, thereby integrally molding the frame body 20 and the filter member 40. As illustrated in FIGS. 2A and 2B, the ends A and B of the frame body 20 are located away from each other in a free state, and the ends A and B are brought close to each other through an elastic deformation of the frame body 20 against an elastic force thereof.

The frame body 20 includes: a pair of support frames 21 and 22 located in parallel with each other at a given interval in the axial direction of the control valve 1 to which the filter device 10 is to be attached; connections 23 located perpendicularly to the support frames 21 and 22 so as to connect longitudinal ends thereof; and plural ribs 24 which connect the support frames 21 and 22. The plural openings 25 are defined in the frame body 20 by the support frames 21 and 22, the connections 23, and the plural ribs 24.

An engagement claw 30 is extended from one of each of both corresponding lateral portions of the faced ends A and B, and a concave portion 35 is provided at the other of each of the both corresponding lateral portions of the faced ends A and B.

Specifically, in this embodiment, in each of the ends A and B of the frame body 20, the engagement claw 30 is extended from one lateral portion, and the concave portion 35 is provided in the other lateral portion so that the engagement claws 30 engage with the concave portions 35, respectively. The concave portions 35 are each formed so as to be located laterally of the opening 25 in the vicinity of the connection 23. In one end of the frame body 20 (for example, in the end A, in this embodiment), the engagement claw 30 is extended from the right lateral portion in FIG. 2A, and the concave portion 35 is formed at the left lateral portion in FIG. 2A; on the other hand, in the other end of the frame body 20 (for example, in the end B, in this embodiment), the concave portion 35 is formed at the right lateral portion in FIG. 2A, and the engagement claw 30 is extended from the left lateral portion in FIG. 2A. Thus, the positional relationship of the engagement claw 30 and the concave portion 35 is reversed between the ends A and B, so that the engagement claw 30 at the one lateral portion of the one end faces the concave portion 35 at the other lateral portion of the other end when the ends A and B are face-to-face with each other.

Each of the engagement claws 30 includes a base portion 31 extending from one side of the connection 23 of the end A or B toward the counterpart end B or A, and an engagement protrusion 32 provided at a tip of the base portion 31 to protrude toward the inner diameter direction of the frame body 20. At the inner diameter side end face of each engagement protrusion 32, a taper surface 32a is formed by gradually reducing the thickness of the engagement protrusion 32 (see FIGS. 2A and 2B and FIG. 3). Each of the concave portions 35 has a taper surface 35a at its inner surface by increasing the depth of the concave portion 35 as it gets close to the connection 23 (see FIGS. 2A and 2B and FIG. 3).

From a state where the ends A and B are located away from each other, the frame body 20 is elastically deformed so that the ends A and B are brought close to each other; then, the engagement claw 30 is engaged with the concave portion 35 at one widthwise lateral portion of each of the ends A and B (i.e., at the support frame 21), and the engagement claw 30 is engaged with the concave portion 35 at the other widthwise lateral portion of each of the ends A and B (i.e., at the support frame 22), thereby connecting the ends A and B to each other.

In each of the ends A and B of the frame body 20, a plate-like extension 37 is extended from a lateral surface of the base portion 31 of the engagement claw 30 to a widthwise intermediate position of the frame body 20. On the other hand, at a region of the connection 23 opposite to the extension 37 in the width direction, a thin portion 39 recessed so as to receive the base portion 31 of the counterpart engagement claw 30 and the counterpart extension 37 (see FIGS. 2A and 2B and FIG. 4B) is formed.

Figure 5A:
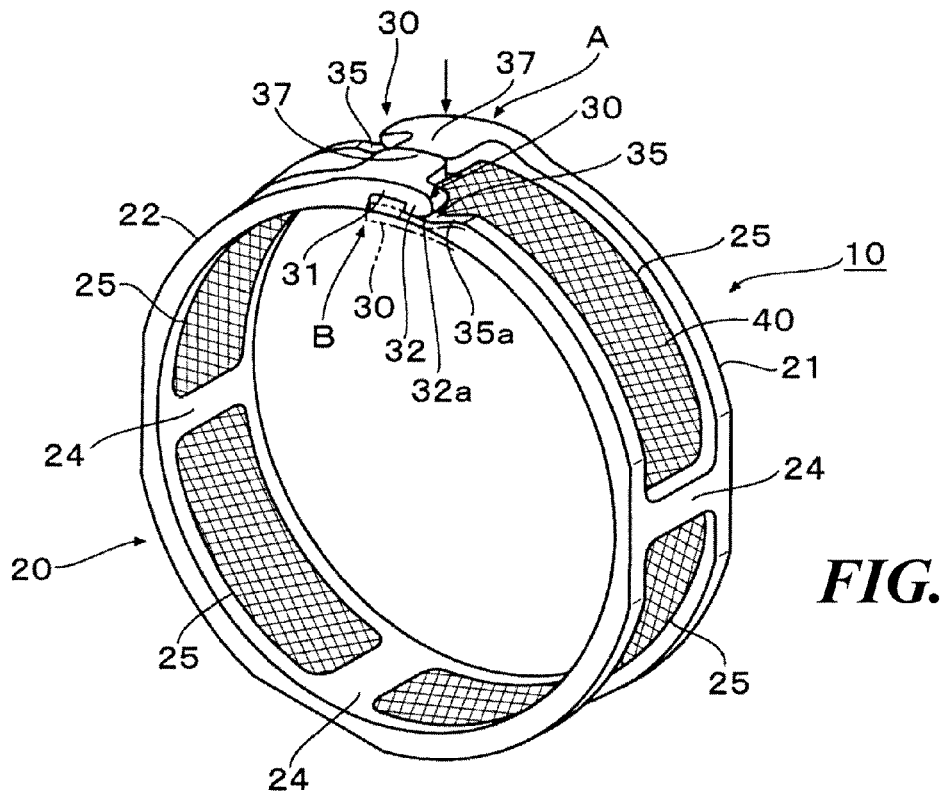
FIG. 5A illustrates a state in which ends of the control valve filter device are connected to each other.
Figure 5B:
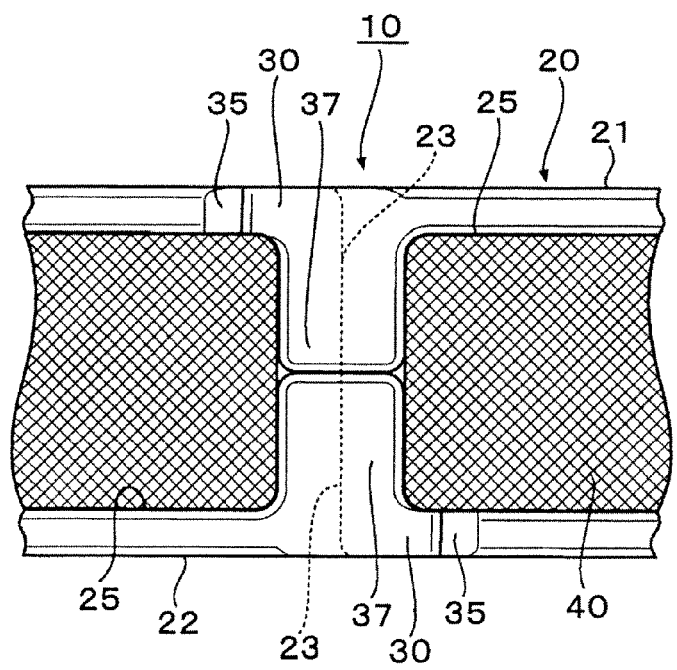
FIG. 5B illustrates the control valve filter device in the state of FIG. 5A, from above.

When the engagement claws 30 and the concave portions 35 of the ends A and B are engaged with each other, the extensions 37 and the base portions 31 of the counterpart engagement claws 30 go into the thin portions 39 of the ends A and B, and inner lateral surfaces of the extensions 37 abut against each other (see FIGS. 5A and 5B).

In this embodiment, each extension 37 is extended to the widthwise intermediate position of the frame body 20. Alternatively, one of the extensions 37 may be extended relatively short or long so as to not reach or to exceed the widthwise intermediate position of the frame body 20. In this case, the other of the extensions 37 may be extended such that the extensions 37 abut with each other when the ends A and B are connected to each other.

While the extensions 37 which are extended from the base portions 31 of the engagement claws 30 are exemplified in the embodiment, the extensions 37 may be omitted. In the foregoing embodiment, each of the ends A and B has the engagement claw 30 and the concave portion 35. However, one of the ends A and B may be provided with only the engagement claw 30, and the other of the ends A and B may be provided with only the concave portion 35.

Next, a method for using the above-mentioned filter devices 10 will be described.

As illustrated in FIG. 1, the filter devices 10 are aligned and placed in the peripheral grooves 3 and 7 of the control valve 1 to which the filter devices 10 are to be attached. Then, the ends A and B are grasped to expand each frame body 20 against the elastic force thereof, and the frame bodies 20 are fitted into the peripheral grooves 3 and 7 of the control valve 1.

Figure 4A:
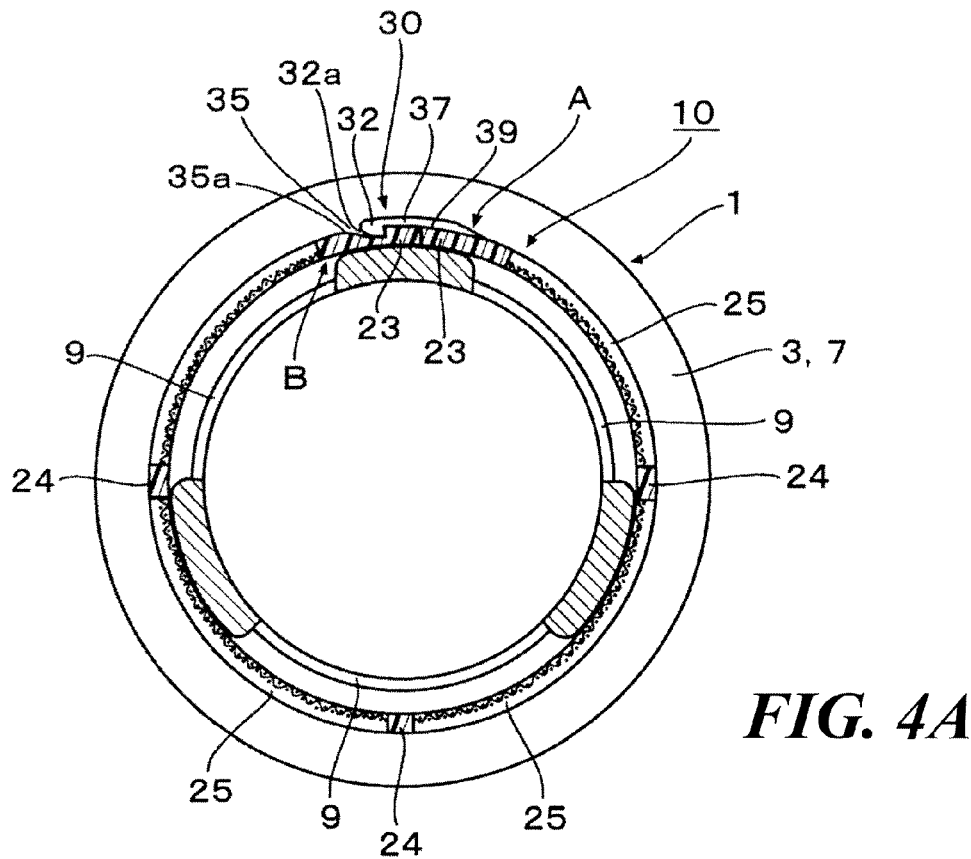
FIG. 4A cross-sectionally illustrates a state in which the control valve filter device is attached to the control valve.
Figure 4B:
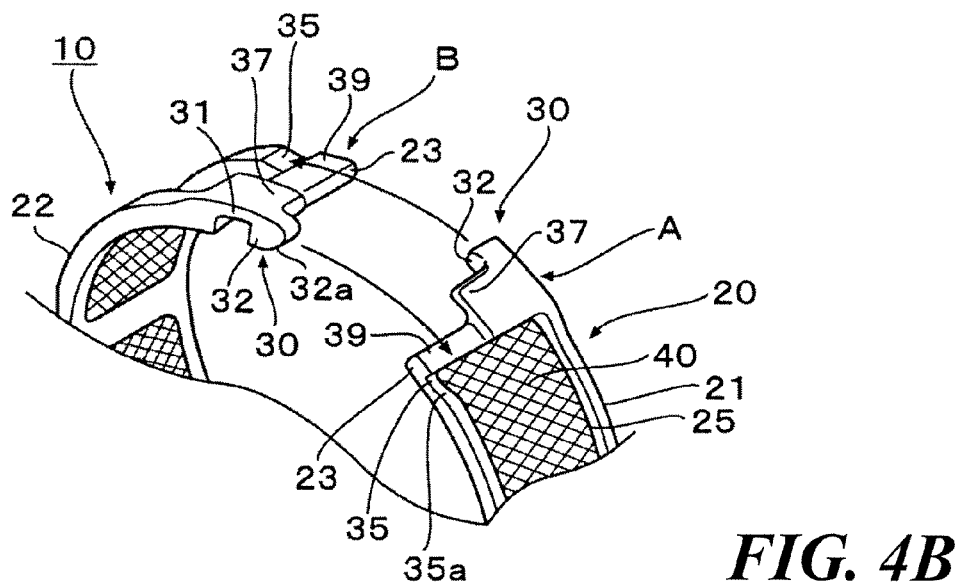
FIG. 4B illustrates a part of the control valve filter device.

In this state, as illustrated in FIG. 4B, the engagement claw 30 of the end A is engaged with the concave portion 35 of the end B of the frame body 20, and the engagement claw 30 of the end B is engaged with the concave portion 35 of the end A of the frame body 20.

Specifically, the ends A and B of the frame body 20 are picked up, and brought close to each other while arranging them in a staggered manner. Then, the taper surface 32a of the engagement claw 30 of the end A is pressed against the thin portion 39 provided in the connection 23 of the end B of the frame body 20, the engagement claw 30 and the extension 37 of the end A are passed through the thin portion 39 of the end B while being elastically deformed slightly in an outward direction, and the engagement claw 30 and the extension 37 of the end A are elastically restored when the engagement protrusion 32 of the engagement claw 30 of the end A has reached the concave portion 35 of the end B. Thus, as illustrated in FIG. 4A, the engagement protrusion 32 of the engagement claw 30 of the end A is engaged with the concave portion 35 of the end B. Similarly, the engagement protrusion 32 of the engagement claw 30 of the end B is also engaged with the concave portion 35 of the end A (see FIG. 5A). In this case, since the taper surface 32a is formed at the engagement protrusion 32 of the tip of the engagement claw 30, the tip of the engagement claw 30 is prevented from being caught by the edge of the connection 23, but can be smoothly brought to positions over the thin portions 39, resulting in good connection workability. When the engagement protrusion 32 is engaged with the concave portion 35, the taper surface 32a abuts against the taper surface 35a.

When the engagement claws 30 and the concave portions 35 of the ends A and B are connected to each other, the connections 23 of the ends A and B abut against each other, and the extensions 37 and the base portions 31 of the engagement claws 30 go into the thin portions 39, respectively. In this state, the extensions 37 abut against each other at the inner lateral surfaces thereof, and cover the abutting surfaces of the connections 23 (see FIGS. 5A and 5B).

As described above, the ends A and B of each frame body 20 are connected to each other through the engagement claws 30 and the concave portions 35, thereby attaching the filter devices 10 to the peripheral grooves 3 and 7 of the control valve 1 as illustrated in FIG. 1 and FIG. 4A.

In this embodiment, in each of these filter devices 10, the concave portions 35 are formed at regions of the support frames 21 and 22, which are located laterally of the openings 25 of the frame body 20, and the engagement claws 30 are engaged with the concave portions 35 in these regions. Therefore, it is not necessary to narrow the openings 25, and the large openings 25 can be ensured, thereby increasing an effective area of the filter member 40 provided in the openings 25.

For example, the filter devices 10 attached to the peripheral grooves 3 and 7 of the control valve 1 as illustrated in FIG. 4A might be rotated due to oscillation, unexpected external force or the like before the control valve 1 is installed in an engine or the like, and the openings 25 of the frame bodies 20 aligned in the port parts 9 might be circumferentially deviated. And, even after the installation of the control valve 1 in the engine, the control valve 1 might be rotated due to fluid pressure or the like.

In the filter devices 10 according to the embodiment, the large openings 25 of the frame bodies 20 can be ensured. Hence, even when the filter devices 10 attached to the peripheral grooves 3 and 7 of the control valve 1 are rotated and the openings 25 of the frame bodies 20 are circumferentially deviated, the port parts 9 of the peripheral grooves 3 and 7 of the control valve 1 can be prevented from being completely closed, and the flow rate of fluid flowing through the filter members 40 and the port parts 9 can be maintained. Thus, for example, it is possible to omit a rotation prevention structure (in the conventional technique, as such rotation prevention structure, a flat surface may be formed in the peripheral groove of the control valve 1, and a connection region of both ends of a frame body may be located at this flat surface), thereby reducing a manufacturing cost.

Since the large openings 25 of the frame body 20 can be ensured, even when the control valve 1 is thin and its outer diameter is small, a large effective area of the filter member 40 is realized, and intrusion of foreign matter such as contaminant into the control valve 1 can be reliably prevented.

In this embodiment, the engagement claws 30 and the concave portions 35 are engaged with each other in a staggered manner at the corresponding lateral portions of the ends A and B. Thus, in the state where the ends A and B of the frame body 20 are connected to each other, even when one of the ends A and B is pushed from outside and one engagement claw 30 is nearly disengaged from the associated concave portion 35 (see the imaginary line in FIG. 5A), the other engagement claw 30 is pressed against the associated concave portion 35, thereby securely retaining a connection of the ends A and B so as not to be disengaged from each other. Therefore, for example, even when a twisting force is applied to the frame body 20, the connection of the ends A and B can be similarly retained so as not to be disengaged from each other.

When the engagement claws 30 and the concave portions 35 of the ends A and B of the frame body 20 are engaged with each other, while the connections 23 of the ends A and B abut against each other, the inner lateral surfaces of the extensions 37, which are extended from the base portions 31 of the engagement claws 30, abut against each other at the widthwise intermediate position of the frame body 20 as illustrated in FIGS. 5A and 5B to cover the abutting surfaces of the connections 23, thereby preventing passage of foreign matter or the like, contained in fluid, through a gap between the abutting surfaces. The extension 37 of one of the ends A and B goes into the thin portion 39 of the other of the ends A and B, and a widthwise half portion at an outer surface of one of the ends A and B of the frame body 20 is covered with the extension 37 of the other of the ends A and B. Therefore, even when the frame body 20 is twisted or the ends A and B of the frame body 20 are pushed, the deformation of the frame body 20 is restricted and thus the filter devices 10 can be less likely to be disconnected from the peripheral grooves 3 and 7 of the control valve 1.

The invention claimed is:

1. A control valve filter device, comprising:
    a belt-like frame body curved into a ring shape so that ends of the frame body face each other, the frame body comprising an opening;
    a filter member provided in the opening of the frame body;
    an engagement claw extended from one of each of both corresponding lateral portions of the faced ends of the frame body; and
    a concave portion provided on an outer circumference surface of the frame body at another of said each of the both corresponding lateral portions of the faced ends of the frame body, so as to be engaged by the engagement claw, when viewed in a width direction of the opening of the frame body, edges of each concave portion overlapping with the opening of the frame body.

2. The filter device of claim 1, wherein, at each end of the frame body, the engagement claw is provided at one of the lateral portions, and the concave portion is provided at another of the lateral portions.

3. The filter device of claim 2, wherein, at said each end of the frame body, a laterally-extended extension is provided at a base side of the engagement claw,
    wherein, at said each end of the frame body, a thin portion recessed so as to receive an associated engagement claw and an associated extension is provided at a tip side of the concave portion, and
    wherein lateral surfaces of the extensions of the faced ends of the frame body abut against each other.

4. The filter device of claim 1, wherein, at each of the ends of the frame body, a laterally-extended extension is provided at a base side of the engagement claw, wherein, at said each of the ends of the frame body, a thin portion recessed so as to receive an associated engagement claw and an associated extension is provided at a tip side of the concave portion, and wherein lateral surfaces of the extensions of the faced ends of the frame body abut against each other.

5. The filter device of claim 1, wherein, at each of the ends of the frame body, a laterally-extended extension is provided at a base side of the engagement claw, and wherein, at said each of the ends of the frame body, a thin portion recessed so as to receive an associated engagement claw and an associated extension is provided at a tip side of the concave portion.

6. The filter device of claim 1, wherein, at each of the ends of the frame body, a laterally-extended extension is provided at the engagement claw, and wherein, at said each of the ends of the frame body, a recess to receive an associated engagement claw and an associated extension is provided at the concave portion.

7. The filter device of claim 1, wherein, at each of the ends of the frame body, a laterally-extended extension is provided at a base side of the engagement claw, and wherein, at said each of the ends of the frame body, a thin portion recessed so as to receive an associated engagement claw and an associated extension is provided at the concave portion.

8. The filter device of claim 1, wherein said each concave portion comprises a recess on the outer circumference surface of the frame body to receive an associated engagement claw.

9. The filter device of claim 1, wherein said each concave portion includes a taper surface formed by increasing a depth of said each concave portion as said each concave portion extends toward a corresponding end of the faced ends of the frame body, and wherein the taper surface extends on the outer circumference surface of the frame body.

10. The filter device of claim 1, wherein the engagement claw is engaged with the concave portion at a widthwise lateral portion of each of the ends of the frame body.

11. A frame body device, comprising:

a frame body comprising an opening and being curved into a ring shape so that ends of the frame body face each other;

an engagement claw extended from one of each of corresponding lateral portions of the faced ends of the frame body; and a concave portion provided at another of said each of the corresponding lateral portions of the faced ends of the frame body, so as to be engaged by the engagement claw, wherein, when viewed in a width direction of the opening of the frame body, edges of the concave portion overlap with the opening of the frame body.

12. The frame body of claim 11, wherein, at said each of the ends of the frame body, the engagement claw is provided at one of the lateral portions, and the concave portion is provided at another of the lateral portions.

13. The frame body of claim 12, wherein the opening holds a frame member.

14. The frame body of claim 11, wherein the frame body includes:

a pair of support frames extending in parallel with each other at a given interval in a lateral extension direction of the frame body; and connections extending perpendicular to the support frames so as to connect longitudinal ends of the support frames, wherein the opening is defined in the frame body by the support frames and the connections, and wherein the concave portion is provided in at least one of the support frames.

15. The frame body of claim 11, wherein, at said each of the ends of the frame body, a laterally-extended extension is provided at a base side of the engagement claw, and wherein, at said each of the ends of the frame body, a thin portion recessed so as to receive an associated engagement claw and an associated extension is provided at a tip side of the concave portion.

16. The frame body of claim 15, wherein lateral surfaces of the laterally-extended extensions of the faced ends of the frame body abut against each other.

17. The frame body of claim 11, wherein the concave portion is provided on an outer circumference surface of the frame body.

18. The frame body of claim 11, wherein at said each of the ends of the frame body, the engagement claw is provided at one of the lateral portions, and the concave portion is provided at another of the lateral portions.

19. A control valve filter device, comprising:

a frame body curved into a ring shape so that ends of the frame body face each other, the frame body comprising an opening;

a filter member provided in the opening of the frame body;

an engagement claw extended from one of each of both corresponding lateral portions of the faced ends of the frame body; and a concave portion provided at another of each of the both corresponding lateral portions of the faced ends of the frame body, so as to be engaged by the engagement claw, wherein the frame body includes:

a pair of support frames extending in parallel with each other at a given interval in a lateral extension direction of the frame body; and connections extending perpendicular to the support frames so as to connect longitudinal ends of the support frames, wherein the opening is defined in the frame body by the support frames and the connections, and wherein the concave portion is provided in at least one of the support frames wherein, when viewed in a width direction of the opening of the frame body, edges of each concave portion overlap with the opening of the frame body.

20. The filter device of claim 1, wherein, after the engagement claw is engaged with the concave portion, in the width direction of the opening of the frame body, edges of the engagement claw overlap with the opening of the frame body.

* * * * *